(12) United States Patent
Haines et al.

(10) Patent No.: US 7,248,382 B2
(45) Date of Patent: Jul. 24, 2007

(54) MEDIA PARAMETER DOWNLOADING

(75) Inventors: Robert E. Haines, Boise, ID (US);
Judith A. Garzolini, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1008 days.

(21) Appl. No.: 09/981,175

(22) Filed: Oct. 17, 2001

(65) Prior Publication Data
US 2003/0072030 A1   Apr. 17, 2003

(51) Int. Cl.
*G06F 3/12* (2006.01)
*G06K 1/00* (2006.01)

(52) U.S. Cl. ............... 358/1.15; 717/171; 358/1.11; 358/1.13; 709/203

(58) Field of Classification Search ............... 358/1.15, 358/1.2, 1.9, 1.12, 2.1, 1.16, 1.13; 709/203, 709/219; 347/107, 184; 399/389; 717/168, 717/171
See application file for complete search history.

(56) References Cited

U.S. PATENT DOCUMENTS

| | | | |
|---|---|---|---|
| 4,617,580 A * | 10/1986 | Miyakawa ............... 346/136 |
| 5,483,653 A * | 1/1996 | Furman ................... 707/200 |
| 5,488,223 A * | 1/1996 | Austin et al. ............. 235/375 |
| 5,600,770 A * | 2/1997 | Kawabata et al. ......... 715/542 |
| 5,801,722 A * | 9/1998 | Ueda et al. ............... 347/16 |
| 6,047,110 A | 4/2000 | Smith ...................... 395/111 |
| 6,099,178 A * | 8/2000 | Spurr et al. .............. 400/207 |
| 6,107,920 A | 8/2000 | Eberhardt et al. ........ 340/572.7 |
| 6,128,098 A * | 10/2000 | Kamada et al. ........... 358/1.8 |
| 6,148,162 A | 11/2000 | Huston et al. ............. 399/66 |
| 6,335,084 B1 | 1/2002 | Biegelsen et al. |
| 6,527,356 B1 * | 3/2003 | Spurr et al. .............. 347/16 |
| 6,546,210 B1 * | 4/2003 | Nakamura ................ 399/12 |
| 6,757,076 B1 * | 6/2004 | Mestha et al. ............ 358/1.9 |
| 6,802,659 B2 * | 10/2004 | Cremon et al. ........... 400/76 |
| 7,054,022 B2 * | 5/2006 | Kazama et al. ........... 358/1.15 |
| 2002/0181015 A1 * | 12/2002 | Whale .................... 358/1.15 |
| 2003/0117639 A1 * | 6/2003 | Milton et al. ............ 358/1.13 |
| 2004/0021879 A1 * | 2/2004 | Castelltort et al. ........ 358/1.3 |

* cited by examiner

*Primary Examiner*—Aung S. Moe
*Assistant Examiner*—Dillon Murphy

(57) ABSTRACT

Systems and procedures are described for an imaging device to download media parameters from a remote server computer that is connected to the imaging device across a network. Specifically, the imaging device detects a media ID from print media. Responsive to detecting the media ID, the imaging device downloads a set of media parameters that correspond to the Media ID from the server computer. The imaging device uses these downloaded media parameters to automatically configure itself.

25 Claims, 5 Drawing Sheets

MEDIA PARAMETER DOWNLOADING

TECHNICAL FIELD

The described subject matter relates to optimizing printer operations. More particularly, the described subject matter pertains to systems and procedures for an imaging device to automatically identify a print media and to download media parameters corresponding to the print media from a remote server computer.

BACKGROUND

Conventional imaging devices such as printers, plotters, copiers, facsimile machines and the like, typically utilize various types of print media to print images. Such print media types include paper based media (e.g., glossy paper, semi-glossy paper, matte paper, etc.) as well as non-paper based media (e.g., vellum, film, etc.).

To optimize print quality, an imaging device generally requires a number of parameters such as print modes, color maps, and/or the like, to be configured. This is because such parameters typically vary with the type of media being utilized. For example, an ink-based imaging device such as an ink jet printer that prints to an overhead transparency (OHT) designed for a laser printer may result in a print that not only may need to re-imaged, but that also may result in gumming-up the internal assembly of the imaging device. This is because ink-based imaging devices use ink and laser-based OHTs do not generally have any ink retention coating. Accordingly, an ink-imaging device may adjust parameters such as printing speed, ink drying time, the amount of ink used, and/or the like, to suit the particular print media being used.

In yet another example, a laser-based imaging device such as a laser printer that prints on an ink-based OHT may melt the ink-based OHT because ink-based OHTs are not manufactured to withstand the amount of heat typically generated by a laser printer's image fusing process. As a result, the imaging job may not only need to be re-imaged, but the job may also result in the need to replace printer parts if the incompatible print media melted onto internal parts of the laser printer. Accordingly, a laser-imaging device may adjust parameters such as the speed of printing, ink-fusing temperature, biasing voltage, and/or the like, to suit the particular print media being used.

Some imaging devices need to be manually configured to properly operate based on the print media type that is going to be used. Thus, print media type information and instructions are typically written on a media box. However, many users do not read the box or the instructions that accompany the media. Once the media is removed from the box for installation into the imaging device, the box is generally thrown away along with the media type indication on the box. Thus, if the print media is removed from one printer and re-installed into a different printer, the user is often required to either remember or guess the print media's corresponding media type to properly configure the different printer.

Accordingly, a number of techniques have been developed for an imaging device to identify the particular type of print media that is loaded into an imaging device. For example, U.S. Pat. No. 7,148,162 to Huston et al., assigned to the assignee hereof, and incorporated herein by reference, describes marking each sheet of print media with eight separate indicia by imprinting the markings either on the face of each media sheet or on the side of each media sheet. E.g., two (2) barcodes are printed on each margin's face or one each edge of a sheet of media, which has four (4) margins/edges—top, right, bottom and left. These markings include a print media type indication. Sensors on the imaging device sense these markings to determine the print media type.

Another conventional technique used by an imaging device to identify print media type is described in U.S. Pat. No. 7,047,110 to Smith, assigned to the assignee hereof, and incorporated herein by reference. Smith describes marking a leading edge of a roll of print media with indicia such as a bar code to indicate media type and the remaining length of media left on the roll. An imaging device reads the marked indicia to obtain the information and then cuts the leading edge of the media off before printing to it. Once a print job is complete, the imaging device readies the media for a next print job by reprinting the information onto the leading edge of the roll.

Once the imaging device has detected the media type, the imaging device attempts to map the detected media type to a set of predetermined media parameters that are hardcoded into the firmware of the imaging device. If the imaging device identifies any media parameters that correspond to the detected media type, the imaging device uses these parameters to configure its operations when printing to the print media.

Unfortunately, these conventional techniques to configure an imaging device do not address how an imaging device will respond to detecting a print media type that cannot be mapped to a predetermined static set of operating parameters that an imaging device may need to properly configure itself to print on the media type. Instead, such techniques typically assume that any required operating parameters are provided by a combination of indicia marked on the print media (e.g., a barcode that identifies a predetermined code for a media type), and predetermined operating parameters hardcoded into the imaging device's firmware that correspond to every type of print media that the device was expected to print on. Because these parameters are hardcoded into firmware, they are unchangeable and static. Thus, if the media type is unknown and/or for some other reason cannot be mapped to such hardwired parameters, the imaging device cannot typically configure itself to appropriately print to the print media.

Accordingly, the various implementations of the following described subject matter address these and other problems of conventional techniques to provide print media parameters to printing devices.

SUMMARY

The described arrangements and procedures provide for an imaging device to download media parameters from a remote server computer that is connected to the imaging device across a network. Specifically, the imaging device detects a media ID from print media. Responsive to detecting the media ID, the imaging device downloads a set of media parameters that correspond to the Media ID from the server computer. The imaging device uses these downloaded media parameters to automatically configure itself to form images on corresponding print media.

BRIEF DESCRIPTION OF THE DRAWINGS

FIG. 2 illustrates further hardware and software aspects of the imaging device.

FIG. 3 illustrates further hardware and software aspects of the remote server.

DETAILED DESCRIPTION

The following description sets forth a specific configuration of a system and procedure that incorporates elements recited in the appended claims. The embodiment is described with specificity to meet statutory requirements. However, the description itself is not intended to limit the scope of this patent. Rather, the inventors have contemplated that the claimed subject matter might also be implemented in other ways, to include different elements or combinations of elements similar to the ones described in this document, in conjunction with other present or future technologies.

Overview

The described arrangements and procedures to download print media parameters corresponding to a detected media ID from a server computer provide a number of benefits as compared to conventional techniques that hardcode media parameters onto the firmware of an imaging device or encode such parameters onto stamped indicia on the print media itself. For example, an imaging device, significantly, is now able to determine a proper set of media parameters to configure itself to print to otherwise unanticipated print media. Additionally, data that is imprinted on print media, which generally include operating parameters for specific printer models and types of print media, are substantially simplified in that they only need to provide a substantially unique identifier (e.g., an ISBN number that identifies a book) with respect to the print media. Furthermore, an imaging device's firmware no longer needs to hardcode all of the potential operating parameters for every possible type of print media that may be loaded in the device.

An Exemplary Image Forming System

Figure 1:
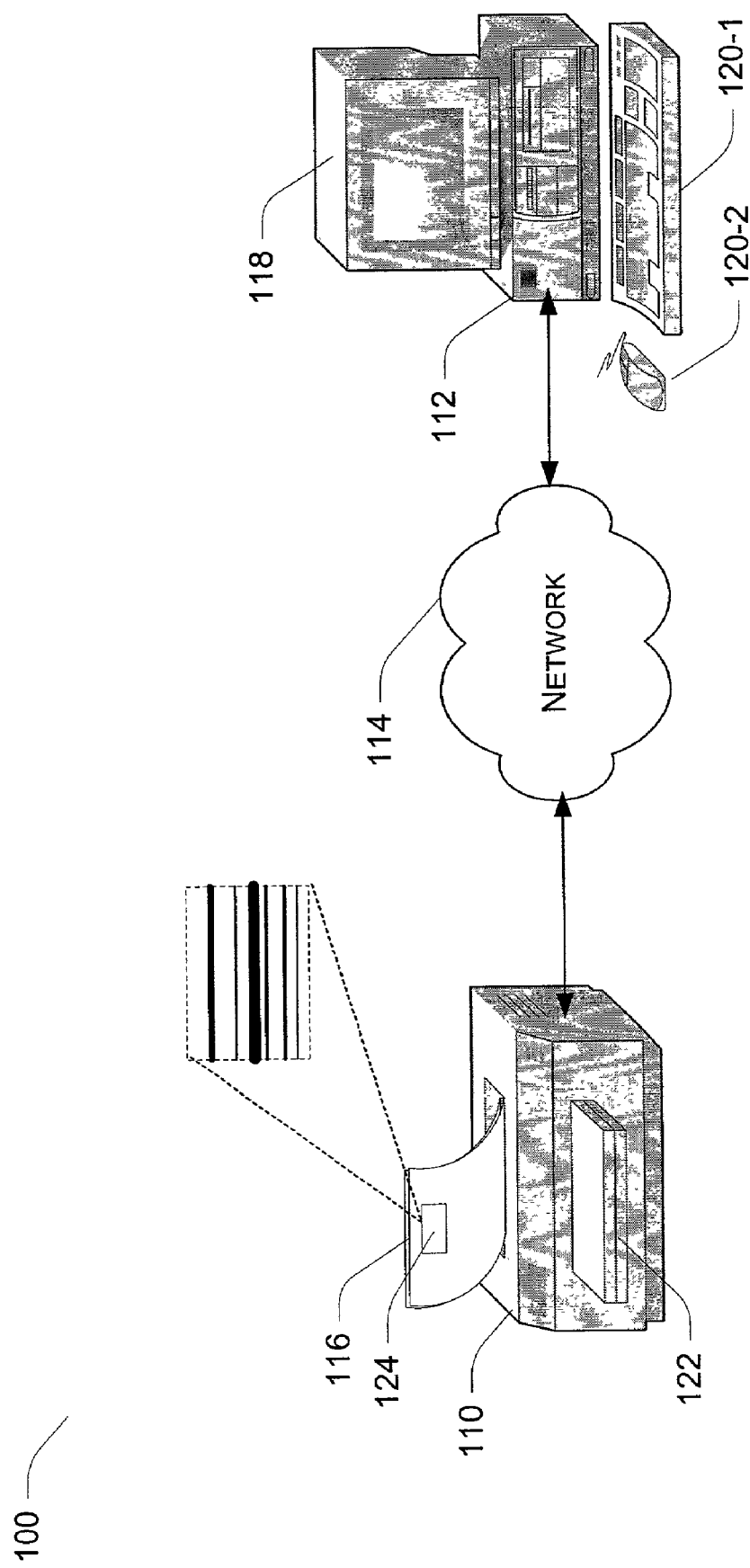
FIG. 1 shows an exemplary image forming system for downloading media parameters to an imaging device.

FIG. 1 shows a system 100 for downloading media parameters, which includes an image-forming device 110, a computer 112, and a communication medium 114 operatively coupling the imaging device to the computer. Exemplary image forming devices include, for example, a printer, such as a laser printer, inkjet printer, a dot matrix printer, a dry medium printer, a plotter, a multiple function peripheral device, a copier, a facsimile machine, and so on.

The image-forming device is configured to form images upon print media 116. Print media may be in a number of different forms such as a stack (or ream) of print media, folded print media, rolled print media, etc. Print media includes, for example, paper, envelopes, transparencies, labels, and the like. In this configuration, the print media is loaded into the imaging device 110 using one or more media supply bins 122.

The computer 112 is implemented as a personal computer (PC), server, a Web Server, or other device configured to communicate with the image forming device 110 over the communication medium. The computer includes an optional display 118 such as a CRT or flat-panel monitor to display information to a user. The computer also includes a number of optional input devices such as a keyboard 120-1 and a mouse 120-2.

An exemplary communication medium 114 includes a parallel connection, packet switched network, such as the Internet, a Local Area Network (LAN), an organizational intranet, and/or other communication configurations operable to provide electronic exchange of information between the host device 112 and the image forming device 110 using an appropriate protocol. Other image forming system arrangements are possible including additional computers 112 and/or additional image forming devices 110 coupled with the communication medium.

When used in a LAN networking environment, the imaging device 110 and remote computer 112 are connected to LAN 114 via network interface or adapter (individual network interface and/or adapters are not shown). When used in a Wide Area Network (WAN) 114 such as the Internet, the imaging device and computer include respective modems (not shown) or other means for establishing communications with one another over the WAN.

Figure 2:
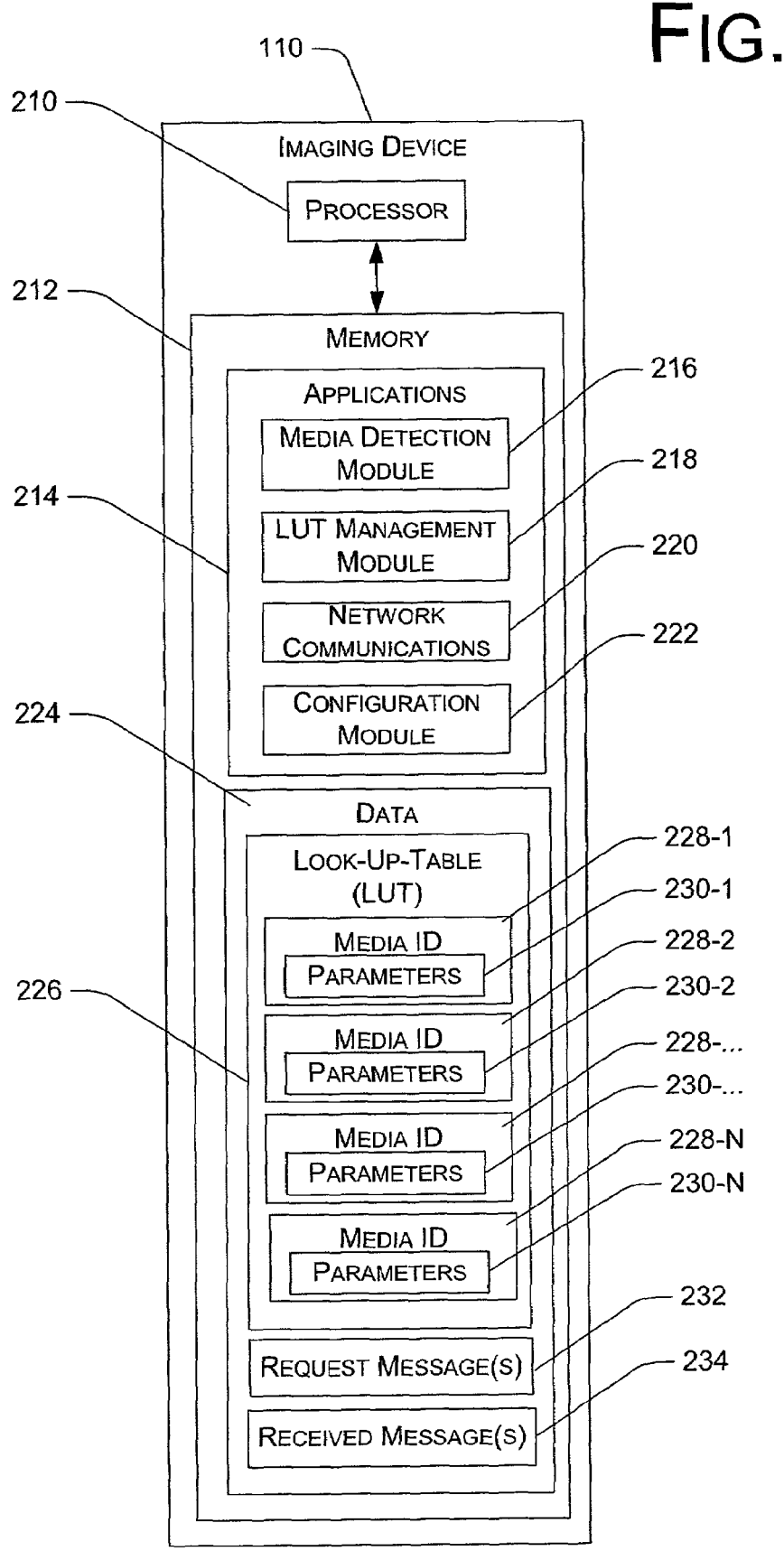
FIG. 2 shows further aspects of an exemplary imaging device of FIG. 1 for downloading media parameters from a remote server computer. In particular.

FIG. 2 shows further aspects of the exemplary imaging device 110 of FIG. 1 for downloading media parameters. In particular, FIG. 2 illustrates further hardware and software aspects of the imaging device. The imaging device includes a processor 210 that is coupled to memory 212. The memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor 210 is configured to fetch and execute computer program instructions from application programs 214 such as an operating system, a network communication module 220, a media type detection module 218, a look-up-table (LUT) management module 218, and an imaging device configuration module 222. The processor is also configured to fetch and store information from/to data 224 such as from/to a LUT 226, and the like, while executing the application programs.

The communication module 220 is configured to use appropriate network protocols to send messages 232 and receive messages 234 across the network 114 of FIG. 1 to/from the remote server computer 112. In particular, the communication module generates, communicates, and receives any one or more of the following types of data/messages; Web pages, electronic mail (e-mail), and/or other types of data packets such as Transmission Control Protocol (TCP)/Internet Protocol (IP)/User Datagram Protocol (UDP) data packets.

To send and receive Web pages, the communication module 220 includes an embedded Web server (EWS) that serves, or communicates a Web page to an Internet Protocol (IP) address or a Universal Resource Locator (URL) that substantially uniquely identifies the remote computer 112 of FIG. 1 across the network 114. The EWS uses an appropriate network transfer protocol such as the Hypertext Transfer Protocol (HTTP) to both serve Web page documents to the remote computer, and to receive Web page documents from the remote computer. URL's can also specify a URL of a File Transfer Protocol Server (FTP) server to download a specified data file such as a portion of a remote LUT that maps a media ID to media parameters.

To send and receive e-mail, the communication module 220 includes an electronic mail client that supports standard e-mail protocols such as Simple Mail Transfer Protocol (SMTP), Internet Message Access Protocol (IMAP), and/or Post Office Protocol (POP). (Techniques to send and receive e-mail messages are well known in the communication arts).

The media detection module 216 detects a media ID (e.g., see, media ID 124 of FIG. 1) from print media that is loaded in one or more media supply bins (e.g., see media supply bin 122 of FIG. 1) of the imaging device 110. The media ID does not need to encode any particular operating parameters for specific printer models or types. Rather, the media indication is any substantially unique identifier used to substantially uniquely identify the media as compared to other media with different media parameters such as a different type, size, composition, and/or the like.

A number of different procedures can be used to identify a media ID, or type that corresponds to media that is loaded into an imaging device. For example, one procedure requires that each sheet of print media in a stack of print media or the leading edge of a roll to be imprinted with a number of indicia that can be sensed by an imaging device such as imaging device 110. To detect such imprinted indicia, the imaging device includes a number of sensors (e.g., optical sensors, which are not shown) to read the imprinted indicia. An exemplary image forming device having such sensors is described in greater detail in reference to U.S. patent application No. 09/981,117, to Haines et al., titled "Image Forming Devices and Methods of Forming Hard images", which was filed on Oct. 17, 2001, and herein incorporated by reference.

In another example, active print media packaging is used to automatically provide an imaging device with an indication of the print media that is loaded into the device. An active package of print media (e.g., ream or a roll of print media) has an electronic tag (e.g., a radio frequency identification tag) either fixed to the package itself, or fixed to a single top or bottom sheet in a ream of print media. The electronic tag is designed to stare print media information. When the packaging and/or the print media are loaded into a supply bin of the imaging device, the imaging device signals the electronic tag to acquire information stored on the tag. Aspects of active packaging are described in greater detail in U.S. patent application No. 09/981,466, to Haines et al., titled "Active Packaging Providing Print Media Information", which was filed on Oct. 17, 2001, and herein incorporated by reference.

The detection module 216 detects the media indication such as media indication 124 of FIG. 1 using any of the above described techniques or other procedures. Responsive to detecting the media type indication from the print media, the LUT management module 218 uses the detected indication to determine if media parameters and/or other information that corresponds to the detected media type are stored in the LUT 226. Such a determination can be based on a number of criteria in addition to the detected media ID, such as the specific model of the imaging device 110, the particular Imaging software or software version that is being used, how the print media is packaged (e.g., in a ream or a roll), and/or the like.

A LUT 226 includes one or more media identifiers 228 to media parameter 230 mappings, which can be used by the device to match the detected media ID to a corresponding set of media parameters. In one configuration, the LUT management module 218 stores one or more "most recently used" media type ID 228 to media parameter 230 mappings in the LUT. The number of mappings in the most recently used table can be user configurable or based on some arbitrary criteria such as an amount of memory 212 that is available at any moment in time to store the table.

The LUT 226 is optional because the imaging device can also download an appropriate set of media parameters that map to the detected media ID from the remote computer 112 of FIG. 1. To illustrate this, consider that in one configuration, if the LUT management module 218 does not identify a set of media parameters that correspond to the detected media ID in the LUT (e.g., because the media type or media ID is new or changed, and/or otherwise not mapped to parameters in the table), the management module downloads a set of media parameters that map to the detected media ID from the remote computer.

Specifically, the imaging device 110 uses the network communication module 220 to communicate a request message 232 that includes information such as the detected media ID to a remote server such as the remote computer 112 of FIG. 1. Responsive to receiving the parameter request message from the imaging device 110, the remote computer 112 sends a response message 234 back to the imaging device. The response includes Information such as a set of parameters that correspond to the detected media ID, an indication that the server is not able to provide corresponding parameters, and/or the like.

An exemplary procedure for an imaging device 110 to download media parameters is described in greater detail below in reference to FIGS. 4 and 5.

An Exemplary Server Computer

Figure 3:
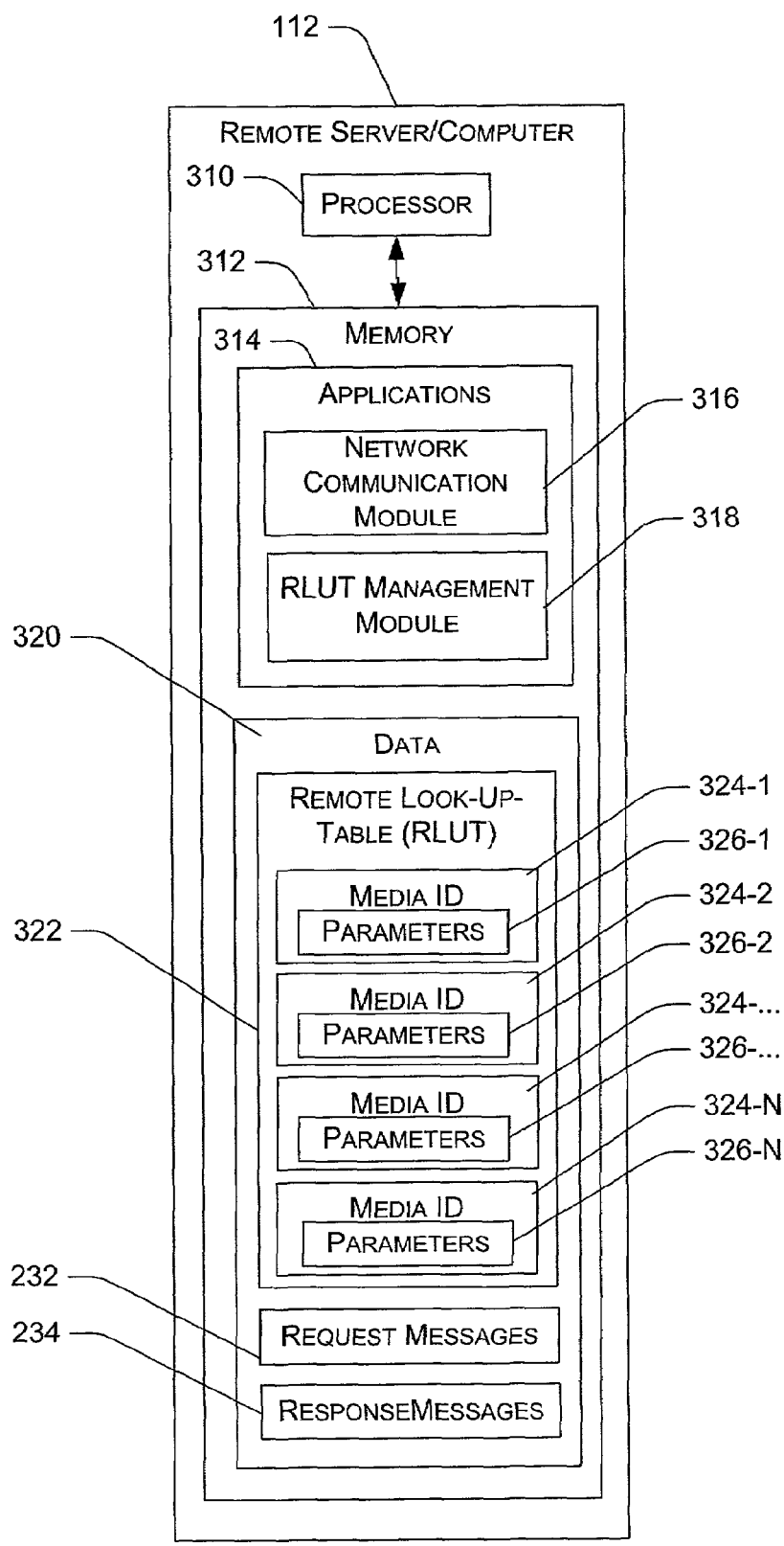
FIG. 3 shows further aspects of an exemplary remote media parameter server computer of FIG. 1 for downloading media parameters to an imaging device. In particular.

FIG. 3 is a block diagram of an exemplary server computer 112 to serve media parameters to an imaging device. In particular, FIG. 3 illustrates further hardware and software aspects of the server computer. The computer includes a processor 310 that is coupled to a memory 312. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

In a networked environment, application program modules 314 (or portions thereof) and/or data 320 (or portions thereof) that are depicted relative to the memory 312 may be stored in a remote memory storage device (not shown) that is operatively coupled to the computer 112.

The processor 310 is configured to fetch and execute computer program instructions from application programs 314 such as an operating system, a network communication module 316, and a remote look-up-table (RLUT) management module 318. The processor is also configured to fetch and store information from/to data 320 such as information from/to a RLUT 322, etc., while executing the application programs.

The communication module 316 is configured to use appropriate network protocols to receive request messages 232 and send response messages 234 respectively from/to the imaging device 110 of FIGS. 1 and 2 across the network 114. In particular, the communication module is able to generate, communicate, and receive any one or more of the following types of data/messages: Web pages, electronic mail (e-mail), and/or other types of data packets such as Transmission Control Protocol (TCP)/Internet Protocol (IP)/User Datagram Protocol (UDP) data packets.

The RLUT includes one or more media IDs 324 that are mapped to respective media parameter 326. In this configuration, the RLUT 322 contains any number of media parameters 326 for various printing technologies. Such media parameters include, for example, a brand name, a media name, a media type (e.g., paper, plastic, coated, etc.), size, thickness, weight, manufacturer, form (e.g., labels, checks, envelopes, etc.), color table, device compatibility, speed at which the media can be fed into a device, fusing temperatures, drying time, valid orientations, duplex options, temperature and humidity ranges, surface roughness, wicking, quantity/length, reorder address, and so on. In this configuration, these parameters are also categorized based on imaging device model type.

When there are differences in media parameters 326 between various imaging device 110 models, software versions, and/or the like, and if the request 232 from the imaging device provides an indication of its model or such other information, the RLUT management module 318 evaluates the RLUT 322 for a set of appropriate media parameters that correspond to the provided information. In this manner, the server 112 is better able to identify those parameters/portions of the RLUT to be downloaded to the requesting imaging device 110.

To illustrate this, consider that a laser printer 110 communicates a request message to the server that specifies not only the media ID of the media that is loaded into the printer, but also indicates other information such as the particular printer model, the particular software or version of the software being used by the printer, how the loaded print media is packaged (e.g., a ream or a roll), and/or the like. Responsive to receiving the request message, the RLUT management module 318 uses this additional information to more particularly customize its search of the RLUT 322 for a substantially optimal set of media parameters 326 to download to the laser printer.

Upon identifying a set of media parameters 326 that correspond to at least the imaging device detected media ID, the server 112 communicates the identified parameters to the imaging device in a response message 234. Or, if no corresponding parameters are located, the response message includes an indication that corresponding parameters are not available from the server.

Exemplary Procedure

Figure 4:
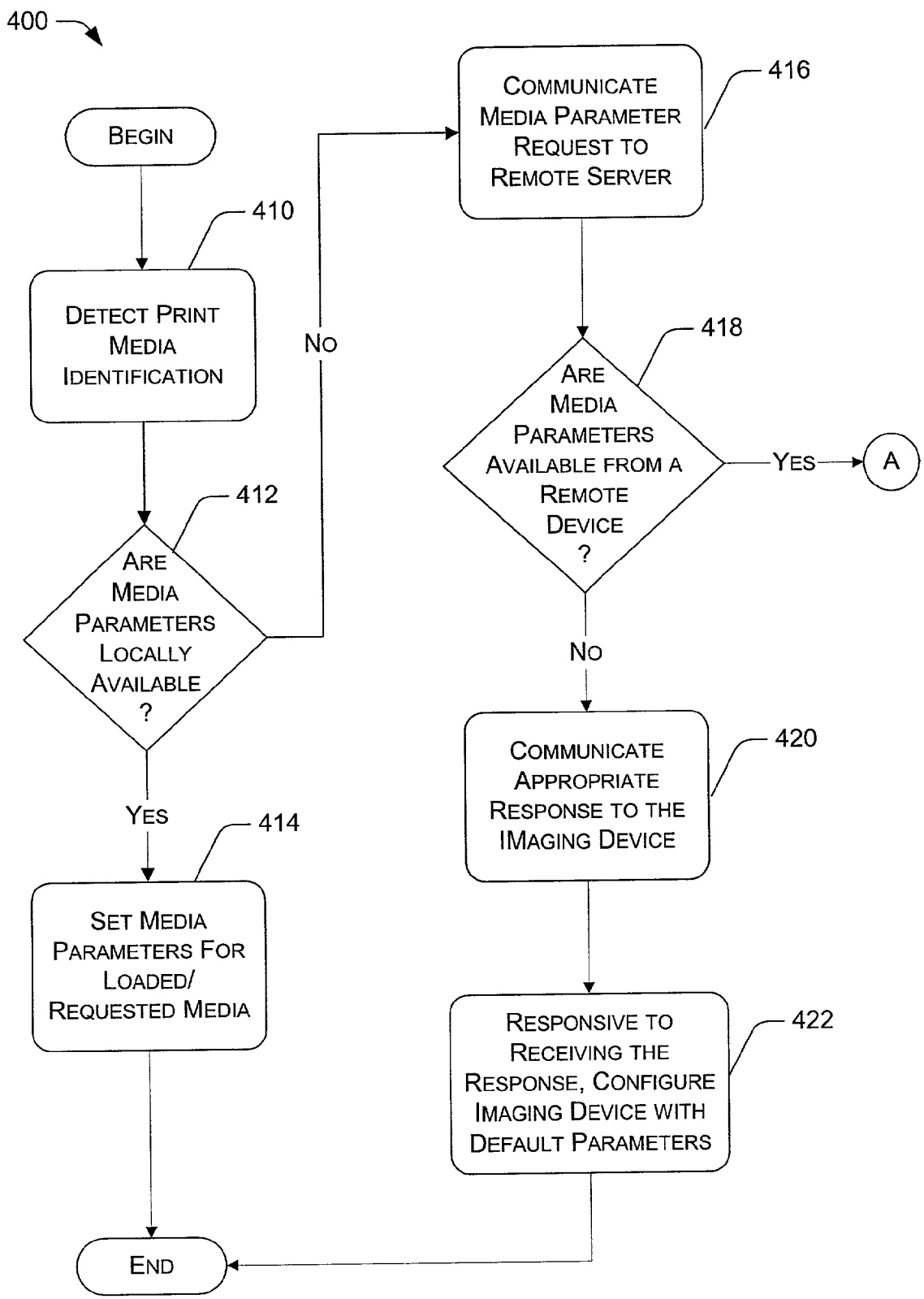
FIG. 4 shows an exemplary procedure to download media parameters to an imaging device.
Figure 5:
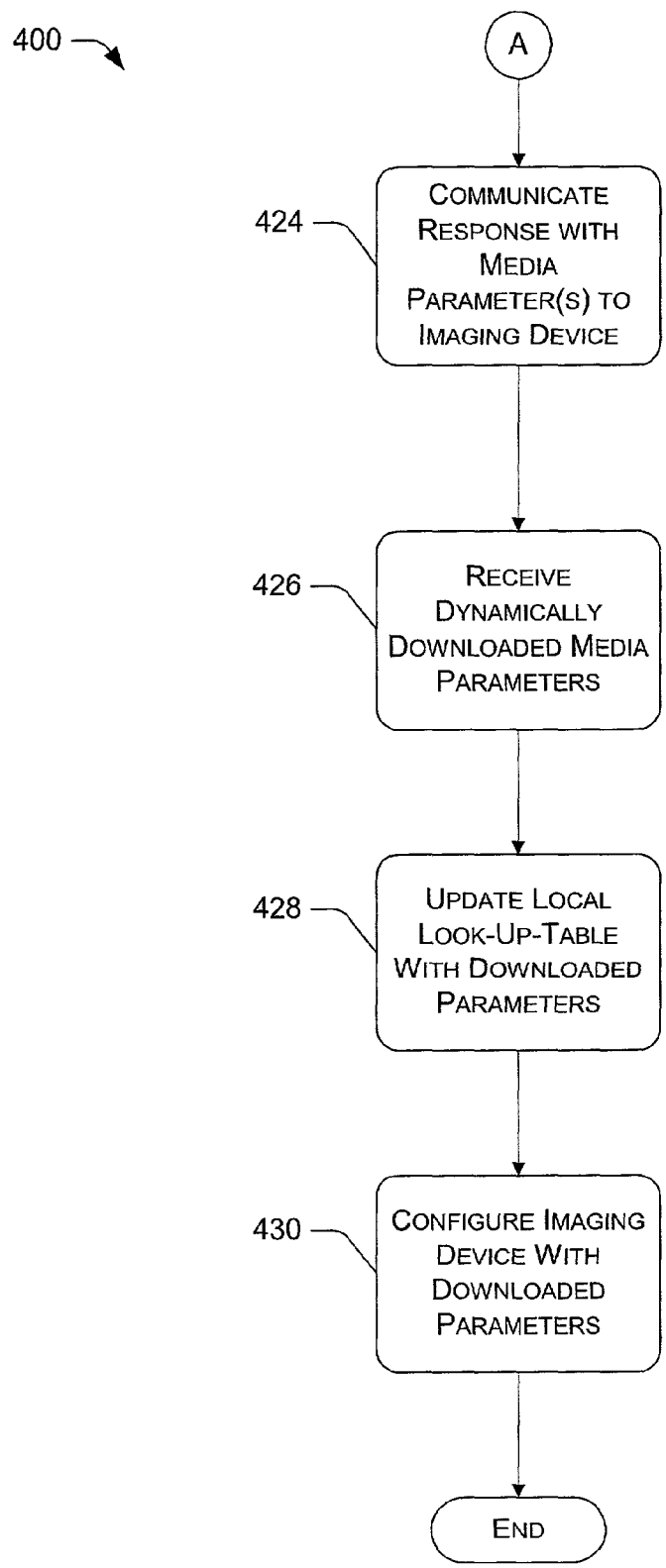
FIG. 5 shows further aspects of the exemplary procedure of FIG. 4 to download media parameters to an imaging device.

FIG. 4 is a flowchart that shows an exemplary procedure 400 to download media parameters to an imaging device (i.e., the imaging device 110 of FIGS. 1 and 2). At block 410, the imaging device detects a media identification indication (e.g., media ID 124 of FIG. 1). Block 410 is performed in response to a number of different criteria.

For example, block 410 is performed in response to recognition by the imaging device that a user has loaded a ream of print media into a tray or loaded a roll of print media onto a spool of the imaging device. In yet another configuration, block 410 is performed responsive to receiving by the imaging device a print, copy, or facsimile job that specifies a particular media. In this configuration, the imaging device identifies the respective media ID's in the media tray(s) and/or on the media roll(s) to determine whether the imaging device has access to the particular print media specified by the job. (If the media is not available, the imaging device can alert the user in some manner such as the communication of a message to indicate the unavailability of the media, the ordering of the specified media, and/or the like.

At block 412, the imaging device determines if a set of media parameters that correspond to the detected media ID (block 410) are locally available in a look-up-table such as the LUT 226 of FIG. 2. If they are available, the procedure continues at block 414, where the imaging device configures its operation based on the identified local media parameters (block 412).

If media parameters corresponding to the detected media ID (block 410) are not locally available (see, block 412), the procedure continues at block 416. At block 416, the imaging device communicates a media parameter request message (i.e., the request message 232 of FIG. 2) to a remote server such as the remote server computer 112 of FIGS. 1 and 3. The parameter request message requests the server to download a set of media parameters that correspond to the detected media ID (block 410) to the imaging device.

At block 418, the remote server determines if it has access to a set of media parameters that correspond to the detected media ID (block 410). The server accomplishes this by evaluating a remote LUT (i.e. RLUT 322 of FIG. 2). At block 420, no matching media parameters having been identified (block 418); the server communicates an appropriate response to the imaging device, which indicates that no parameters were identified. At block 422, responsive to receiving the response of block 420, the imaging device configures its operating parameters based on a default set of media parameters.

At block 424, the server having identified a set of media parameters that correspond to the detected media ID (block 410), the server communicates an appropriate response to the imaging device, which includes at least a portion of the identified parameters. At block 426, the imaging device receives the response. At block 428, responsive to receiving the response from the server, the imaging device optionally updates a local look-up-table (i.e. LUT 226 of FIG. 2) with the received parameters.

At block 430, the imaging device configures its operating parameters based on the downloaded set of media parameters. In this manner, an imaging device, significantly, is now able to configure itself according to media parameters that correspond to a new or otherwise unanticipated print media and determine a proper set of media parameters to use to print to the print media.

Conclusion

Although the subject matter has been described in language specific to structural features and/or methodological operations, it is to be understood that the subject matter defined in the appended claims is not necessarily limited to the specific features or operations described. Rather, the specific features and operations are disclosed as preferred forms of implementing the claimed invention.

The invention claimed is:

1. In a system comprising an imaging device that is operatively coupled across a network to a server computer, a method comprising:
   detecting, by the imaging device, a media ID from print media, the media ID substantially unique to a type of the print media;
   responsive to detecting the media ID, determining whether any predetermined sets of media parameters contained in the imaging device correspond to the media ID and at least one of a model type of the imaging device, a software version of the imaging device, or a packaging type of the print media; and
   if none of the predetermined sets of media parameters correspond,
      downloading a set of media parameters corresponding to the media ID and at least one of the model type of the imaging device, the software version of the imaging device, or the packaging type of the print media from the server computer to the imaging device and automatically configuring the imaging device based on the media parameters downloaded to the imaging device.

2. A method as recited in claim 1, wherein detecting the media ID is performed responsive to determining that print media has been loaded into a print media supply tray or roll that is coupled to the imaging device.

3. A method as recited in claim 1, wherein detecting the media ID is performed responsive to receiving an imaging job request.

4. A method as recited in claim 1, wherein downloading the media parameters further comprises:

communicating, by the imaging device, a media parameter request message to the server computer, the media parameter request message comprising the media ID; and the imaging device receiving a media parameter response message comprising the media parameters from the server computer.

5. The method of claim 1, further comprising:

responsive to downloading the set of media parameters, updating a look-up-table at the imaging device to map the media ID to the set of media parameters.

6. The method of claim 1, further comprising:

responsive to downloading the set of media parameters, updating a look-up-table at the imaging device to map the media ID to the set of media parameters such that the look-up-table indicates a plurality of most recently used media ID to set of media parameter mappings.

7. The method of claim 1, further comprising:

if at least one of the predetermined sets of media parameters correspond to the media ID, automatically configuring the imaging device based on the at least one predetermined set of media parameters.

8. The method of claim 1, wherein the predetermined sets of media parameters include at least one set of media parameters prestored in the imaging device in unmodifiable form, and at least one set of media parameters previously downloaded from the server computer to the imaging device.

9. A computer-readable medium comprising computer-executable instructions, the computer-executable instructions comprising instructions for:

detecting, by an imaging device, a media ID from print media, the media ID substantially unique to a type of the print media;

responsive to detecting the media ID, determining whether any predetermined sets of media parameters contained in the imaging device correspond to the media ID and at least one of a model type of the imaging device, a software version of the imaging device, or a packaging type of the print media; and if none of the predetermined sets of media parameters correspond, downloading a set of media parameters corresponding to the media ID and at least one of the model type of the imaging device, the software version of the imaging device, or the packaging type of the print media from a server computer that is operatively coupled to the imaging device across a network to the imaging device and automatically configuring the imaging device based on the media parameters downloaded to the imaging device.

10. A computer-readable medium as recited in claim 9, wherein the instructions for detecting the media ID are performed responsive to computer-executable instructions that make a determination that print media has been loaded into a print media supply tray or roll that is coupled to the imaging device.

11. A computer-readable medium as recited in claim 9, wherein the instructions for detecting the media ID are performed responsive to computer-executable instructions indicating that an imaging job request has been received.

12. A computer-readable medium as recited in claim 9, wherein the instructions for downloading the media parameters further comprise instructions for:

communicating, by the imaging device, a media parameter request message to the server computer, the media parameter request message comprising the media ID; and the imaging device receiving a media parameter response message comprising the media parameters from the server computer.

13. In a system comprising a server computer that is operatively coupled across a network to an imaging device, a method comprising:

receiving, by the server computer, a media parameter request message comprising a substantially unique media ID that corresponds to a particular type of print media, and at least one of a model type of the imaging device, a software version of the imaging device, and a packaging type of the print media, the media parameter request message having been communicated to the server computer by the imaging device;

responsive to receiving the media parameter request message, evaluating a remote look-up-table to determine a set of media parameters that correspond to the substantially unique media ID and the at least one of a model type of the imaging device, a software version of the imaging device, and a packaging type of the print media; and downloading the media parameters to the imaging device.

14. A method as recited in claim 13, wherein downloading the media parameters further comprises:

communicating, by the server device, a response message to the imaging device that comprises the media parameters.

15. A computer-readable medium comprising computer-executable instructions, the computer-executable instructions comprising instructions for:

receiving, by a server computer, a media parameter request message comprising a substantially unique media ID that corresponds to a particular type of print media, and at least one of a model type of the imaging device, a software version of the imaging device, and a packaging type of the print media, the media parameter request message having been communicated to the server computer by an imaging device that is operatively coupled to the server computer across a network;

responsive to receiving the media parameter request message, evaluating a remote look-up-table to determine a set of media parameters that correspond to the substantially unique media ID and the at least one of a model type of the imaging device, a software version of the imaging device, and a packaging type of the print media; and downloading the media parameters to the imaging device.

16. A computer-readable medium as recited in claim 15, wherein the instructions for downloading the media parameters further comprise instructions for:

communicating, by the server device, a response message to the imaging device that comprises the media parameters.

17. A server computer comprising computer executable instructions as recited in claim 15.

18. An imaging device, comprising:
a memory;
a look-up-table stored in the memory and that associates each of one or more predetermined media identifiers with a corresponding set of media parameters;
a sensor configured to detect a media identifier from print media provided to the imaging device;
a communications module configured to, if the detected media identifier does not match any of the predetermined media identifiers, communicate the detected media identifier to a server computer coupled to the imaging device; and
a configuration module configured to, if a set of media parameters corresponding to the detected media identifier is received from the server computer, automatically configure the imaging device according to the received set of media parameters.

19. The imaging device of claim 18, further comprising a management module configured to determine whether the detected media identifier matches any of the predetermined media identifiers in the look-up-table so as to ascertain a matching set of media parameters in the look-up-table.

20. The imaging device of claim 19, wherein the look-up-table further maps each set of media parameters to one or more of an imaging device model type, an imaging device software version, or a media packaging type, and wherein the management module further compares at least one of a model type of the imaging device, a software version of the imaging device, and a packaging type of the print media with the look-up-table so as to ascertain the matching set of media parameters.

21. The imaging device of claim 18, wherein the look-up-table includes a first part disposed in a read-only portion of the memory and comprising at least one set of media parameters prestored in the imaging device, and a second part disposed in a read/write portion of the memory and comprising at least one set of media parameters previously downloaded from the server computer to the imaging device.

22. The imaging device of claim 21, wherein the at least one set of previously downloaded media parameters includes a plurality of sets of previously downloaded media parameters.

23. The imaging device of claim 22, wherein the plurality of sets of previously downloaded media parameters comprises the most recently downloaded sets.

24. The imaging device of claim 18, wherein the media identifier is substantially unique to the associated print media.

25. The imaging device of claim 18, wherein the media identifier does not embody the corresponding set of media parameters.

* * * * *

UNITED STATES PATENT AND TRADEMARK OFFICE
CERTIFICATE OF CORRECTION

| | |
|---|---|
| PATENT NO. | : 7,248,382 B2 |
| APPLICATION NO. | : 09/981175 |
| DATED | : July 24, 2007 |
| INVENTOR(S) | : Robert E. Haines et al. |

It is certified that error appears in the above-identified patent and that said Letters Patent is hereby corrected as shown below:

In column 5, line 38, delete "stare" and insert -- store --, therefor.

In column 5, line 59, delete "roil" and insert -- roll --, therefor.

In column 8, line 16, delete "FIG. 2" and insert -- FIG. 3 --, therefor.

Signed and Sealed this

Fifth Day of August, 2008

JON W. DUDAS
*Director of the United States Patent and Trademark Office*